United States Patent
Kuo

[11] Patent Number: 5,973,671
[45] Date of Patent: Oct. 26, 1999

[54] COMPUTER POINTING DEVICE

[75] Inventor: Shih-Jen Kuo, Taipei, Taiwan

[73] Assignee: Behavior Tech Computer Corp., Taipei, Taiwan

[21] Appl. No.: 08/959,240

[22] Filed: Oct. 28, 1997

[51] Int. Cl.$^6$ ...................................................... G09G 5/08
[52] U.S. Cl. ........................... 345/157; 345/163; 345/167
[58] Field of Search ..................................... 345/157, 156, 345/145, 164, 163, 160, 167

[56] References Cited

U.S. PATENT DOCUMENTS

| | | | |
|---|---|---|---|
| 4,806,917 | 2/1989 | Hosogoe ................................. | 345/164 |
| 5,565,887 | 10/1996 | McCambridge et al. ............... | 345/145 |
| 5,828,364 | 10/1998 | Siddiqui ................................. | 345/163 |

*Primary Examiner*—Richard A. Hjerpe
*Assistant Examiner*—Ronald Laneau

[57] ABSTRACT

A computer pointing device includes a casing having a top on which a button rotatably support by a ball joint. The button has a plurality of pins corresponding to a plurality of openings formed on the top of the casing. A rubber pad is disposed within the casing, having a plurality of raised projections respectively received within the openings, each having a hollow configuration to receive and retain therein a conductor. The projections selectively collapse when the button is depressed to have at least one of the pins engaging the corresponding projections via the openings so as to move the conductors thereof in a downward direction. A circuit board is disposed under the rubber pad, having conductive ribs formed thereon to be selectively engageable by each of the conductors when the projections collapses to cause the downward movement of the conductors. This establishes an electrical connection between the conductors and at least one of the ribs to give a signal which indicates a moving direction associated with the depressed projections and a speed determined by the number of the ribs that are contacted by the depressed conductors. The circuit board has a circuit to process and transmit the signals to a computer to control the cursor on the monitor screen.

10 Claims, 4 Drawing Sheets

COMPUTER POINTING DEVICE

FIELD OF THE INVENTION

The present invention relates to a computer pointing device and in particular to a pointing device using a depression action to generate pointing movement of the monitor cursor, rather than using a rolling movement of a spherical member as is the mouse or tracking ball.

BACKGROUND OF THE INVENTION

The most common computer pointing devices include computer mouse and tracking balls. Both are classified as electronic type, optic type and semi-optic type. The electronic type pointing device or mouse comprises a ball or spherical member which is rollingly movable with respect to two variable resistors respectively representing two orthogonal axes defining the plane of the monitor screen. The rolling movement causes the variable resistors to change their resistance and thus providing a signal indicating the displacement associated with the monitor cursor in the two axes. A disadvantage of the electronic type pointing device is that it is less precise. Further, the variable resistors may be subject to oxidation when exposed in the atmosphere.

The optic type pointing device uses photo-transistors to replace the rolling movement of the spherical member of the electronic type mouse. A disadvantage associated with the optic type mouse is that the photo-transistors are very easy to be damaged. Further, the optic mouse has to be operated on a dark pad and is more costly.

The semi-optic type pointing device takes advantages of the benefits of both the electronic type and the optic type, using the rolling motion of a spherical member to drive rotatable means which are associated with two sets of light emitting diode and photo-transistor to convert the rolling motion of the spherical member into electrical signals. The advantages of the semi-optic type mouse are that it has a good precision, that it is only moderately cost and that it has a longer service life. Thus, most of the computer mouses available in the market are of the semi-optic type.

A problem associated with the semi-optic type computer mouse is that the spherical member of the mouse is in general in contact engagement with two rotatable shafts to drive the shafts in order to convert the rolling motion of the spherical member into electrical signals. The contact engagement, however, inevitably causes un-desired displacement of the shafts. This deteriorates the precision of positioning the cursor in the monitor screen, especially in handling high precision drawings.

Further, the spherical member of the mouse is generally rolling on for example a mouse pad. Dusts and ashes may be brought into the mouse by adhering to the surface of the tracking ball during the rolling motion thereof. Such dusts may get stuck to the shafts by being brought into contact with the shafts by the spherical member. This may eventually result in an improper operation of the conversion of the rolling motion of the spherical member into electrical signals. Thus it requires frequent and periodic cleaning of the shafts and the spherical member.

In addition, in operating a mouse, the user has to continuously move the mouse relative to the mouse pad or a fixed surface with his or her hand. This may cause strain of the wrist muscle, especially for using mouse for a long while.

Moreover, the relationship between the motion of the spherical member relative to the mouse pad and the movement of the cursor in the monitor screen is in general not consistent. Thus, a user has to get acquaint with the relationship before he or she may operate the mouse well. This is very inconvenient for the user.

Thus, it is desirable to have an improved computer pointing device which overcomes the problems encountered in the conventional pointing devices or mouses.

SUMMARY OF THE INVENTION

Therefor, the principal object of the present invention is to provide a computer pointing device wherein a movably supported button is provided to control electrical engagement of one of a plurality of conductors, each representing a different direction, with a plurality of conductive members in which the number of the contacted conductive members indicates the speed difference, so as to overcome the problems encountered in the prior art computer pointing device.

Another object of the present invention is to provide a computer pointing device which uses a manually depressible button to replace the rolling ball in the prior art computer pointing device so as to overcome the problem of dust stuck to the rolling ball in contact with a mouse pad.

A further object of the present invention is to provide a computer pointing device which uses the depression of a button to replace the rolling motion of a spherical member so that the user may not need to move the pointing device about with his or her hand.

A further object of the present invention is to provide a computer pointing device of which the computer monitor cursor is controlled by depressing a button rather than moving a spherical member about on a pad so that the position of the cursor on the screen is more determined.

A further object of the present invention is to provide a computer pointing device having a good precision at a suitable cost.

A further object of the present invention is to provide a computer pointing device which is in general stationary so that the wiring between the computer and the pointing device may be more easily to arrange.

A further object of the present invention is to provide a computer pointing device which is in general stationary so as to facilitate using wireless infrared communication between the computer and the pointing device.

To achieve the above objects, in accordance with the present invention, there is provided a computer pointing device comprising a casing having a top on which a button rotatably support by a ball joint. The button has a plurality of pins corresponding to a plurality of openings formed on the top of the casing. A rubber pad is disposed within the casing, having a plurality of raised projections respectively received within the openings, each having a hollow configuration to receive and retain therein a conductor. The projections selectively collapse when the button is depressed to have at least one of the pins engaging the corresponding projections via the openings so as to move the conductors thereof in a downward direction. A circuit board is disposed under the rubber pad, having conductive ribs formed thereon to be selectively engageable by each of the conductors when the projections collapses to cause the downward movement of the conductors. This establishes an electrical connection between the conductors and at least one of the ribs to give a signal which indicates a moving direction associated with the depressed projections and a speed determined by the number of the ribs that are contacted by the depressed conductors. The circuit board has a circuit to process and transmit the signals to a computer to control the cursor on the monitor screen.

BRIEF DESCRIPTION OF THE DRAWINGS

The present invention will be better understood from the following description of a preferred embodiment thereof with reference to the attached drawings, wherein.

DETAILED DESCRIPTION OF THE PREFERRED EMBODIMENT

Figure 1:
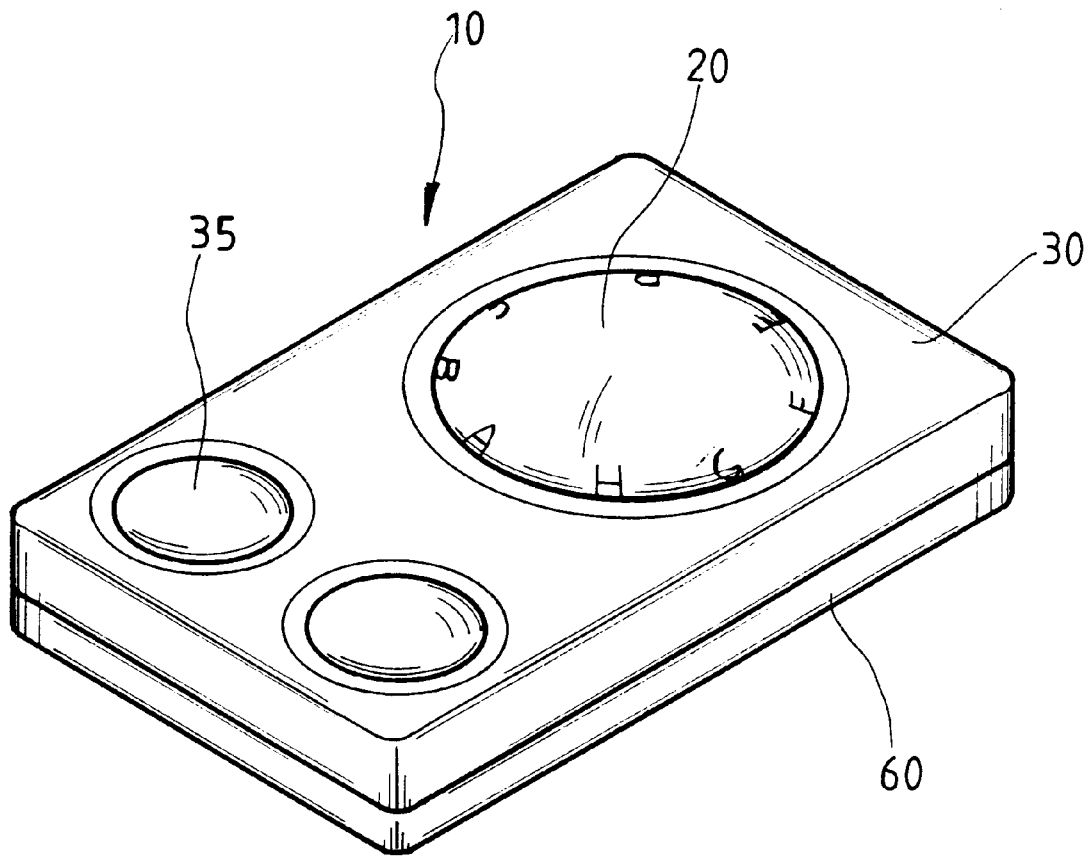
FIG. 1 is a perspective view showing a computer pointing device in accordance with the present invention.
Figure 2:
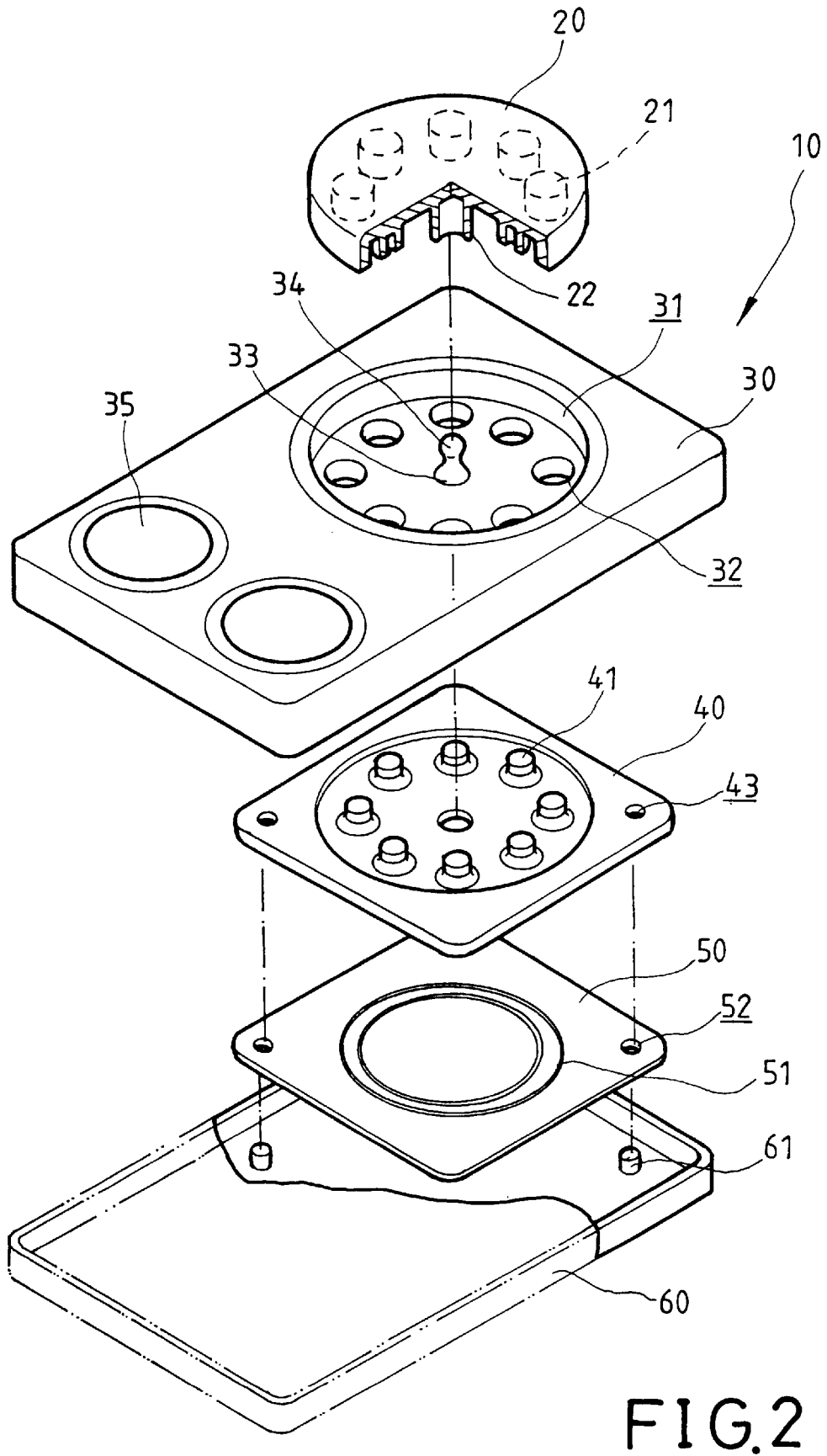
FIG. 2 is an exploded perspective view of the computer pointing device of the present invention.

With reference to the drawings and in particular to FIGS. 1 and 2, wherein a computer pointing device constructed in accordance with the present invention, generally designated with reference numeral 10, is shown, the pointing device 10 comprises a casing comprised of an upper casing member 30 and a lower casing member 60 mounted together to define therebetween an interior space for receiving therein a rubber pad 40 and a circuit board 50.

The upper casing member 30 comprises a recess 31 having a bottom on which a plurality of openings 32 are formed, preferably equally spaced from each other, to surround a post 33. Preferably and as shown in FIG. 2, the openings 32 are spaced along a circular trace with the post 33 located at the center of the circular trace. In this case, the recess 31 may be a circular cavity substantially concentric with the post 34.

A button 20 having a shape corresponding to the recess 31 of the upper casing member 30 is movably received within the recess 31. The button 20 has formed on the underside thereof a ball socket 22 for receiving and holding therein a ball-shaped top end 34 of the post 33 so as to form a ball joint therebetween. This makes the button 20 rotatably supported on the post 33 with respect to the post 33. The rotation of the button 20 allows a circumference of the button 20 to be moved toward/away from the bottom of the recess 31.

The button 20 also has a plurality of depression pins 21 formed on the underside thereof and corresponding in position and size to the openings 32 of the recess 31. The rotation of the button 20 with respect to the post 33 makes the depression pins 21 approach/depart from the corresponding openings 32.

In the embodiment illustrated, there are eight such depression pins 21 respectively labelled A–H (see FIG. 1) corresponding to eight different directions.

The lower casing member 60 comprises a plurality of dwell pins 61 on an inner bottom surface thereof over which corresponding holes 52 formed on the circuit board 50 are fit so as to firmly secure the circuit board 50 in position on the bottom of the lower casing member 60. The circuit board 50 comprises at least one conductive rib 51 formed thereon and corresponding in position to the openings 32 of the recess 31 of the upper casing member 30. Preferably, there are two such conductive ribs 51 provided on the circuit board 50 in a concentric manner with one completely surrounded by and spaced from the other one.

Figure 3:
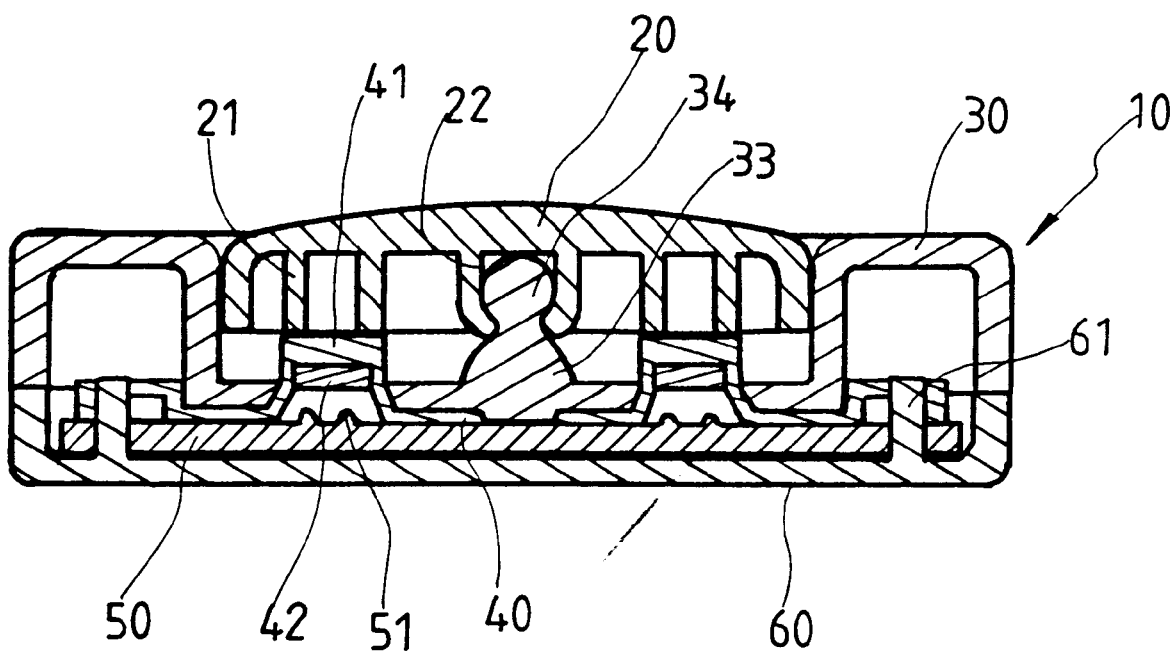
FIG. 3 is a cross-sectional view of the computer pointing device of the present invention.

The rubber pad 40 is interposed between the portion of the upper casing member 30 where the recess 31 is formed and the circuit board 50, as shown in FIG. 3. The rubber pad 40 is provided with positioning holes 43 which are corresponding to and fit over the dwell pins 61 of the lower casing member 60 to position over the circuit board 50. The rubber pad 40 comprises a plurality of upward raised projections 41 corresponding in position and size to the openings 32 of the recess 31 of the upper casing member 30. The projections 41 are also corresponding in position to the conductive ribs 51 of the circuit board 50.

Each of the projections 41 is a hollow cone- or cylinder-like member having a conductor 42 received and retained therein, see FIG. 3. The hollow configuration of the projections 41 make them very easy to collapse upon acted upon by external forces. Preferably, the projections 41 are (at least partially) received within the corresponding openings 32 of the upper casing member 30 so that when the button 20 is rotated by being manually depressed with respect to the post 33 to bring the depression pins 21 toward the respective openings 32, one of the depression pins 21 is brought into contact engagement with the respective projection 41 and thus depressing and collapsing the respective projection 41. This drives the conductor 42 contained in the collapsed projection 41 toward and into contact engagement with at least one of the conductive ribs 51 so that an electrical connection is established therebetween. Such an electrical connection provides an electrical signal to a circuit (see FIG. 4) to be processed thereby so as to generate a signal representing the desired moving direction and speed of for example a cursor (not shown) on a computer (not shown) to control the movement of the cursor on the computer monitor screen.

In case that there are two or more conductive ribs 51 on the circuit board 50, a more forcible depression of the button 20 causes the conductor 42 inside the depressed projection 41 to get into contact with more than one such ribs 51 and this may be used to indicate the cursor speed on the monitor screen. The more of the number the ribs 51 is contacted by the conductor 42, the higher the cursor speed may be rendered. The electrical signal that is generated by means of the contact of the conductor 42 to the conductive ribs 51 which represents the desired moving direction and speed of the cursor is processed by a circuit (FIG. 4) on the circuit board 50 to provide a suitable control signal to the computer to manipulate the cursor on the monitor screen.

Figure 4:
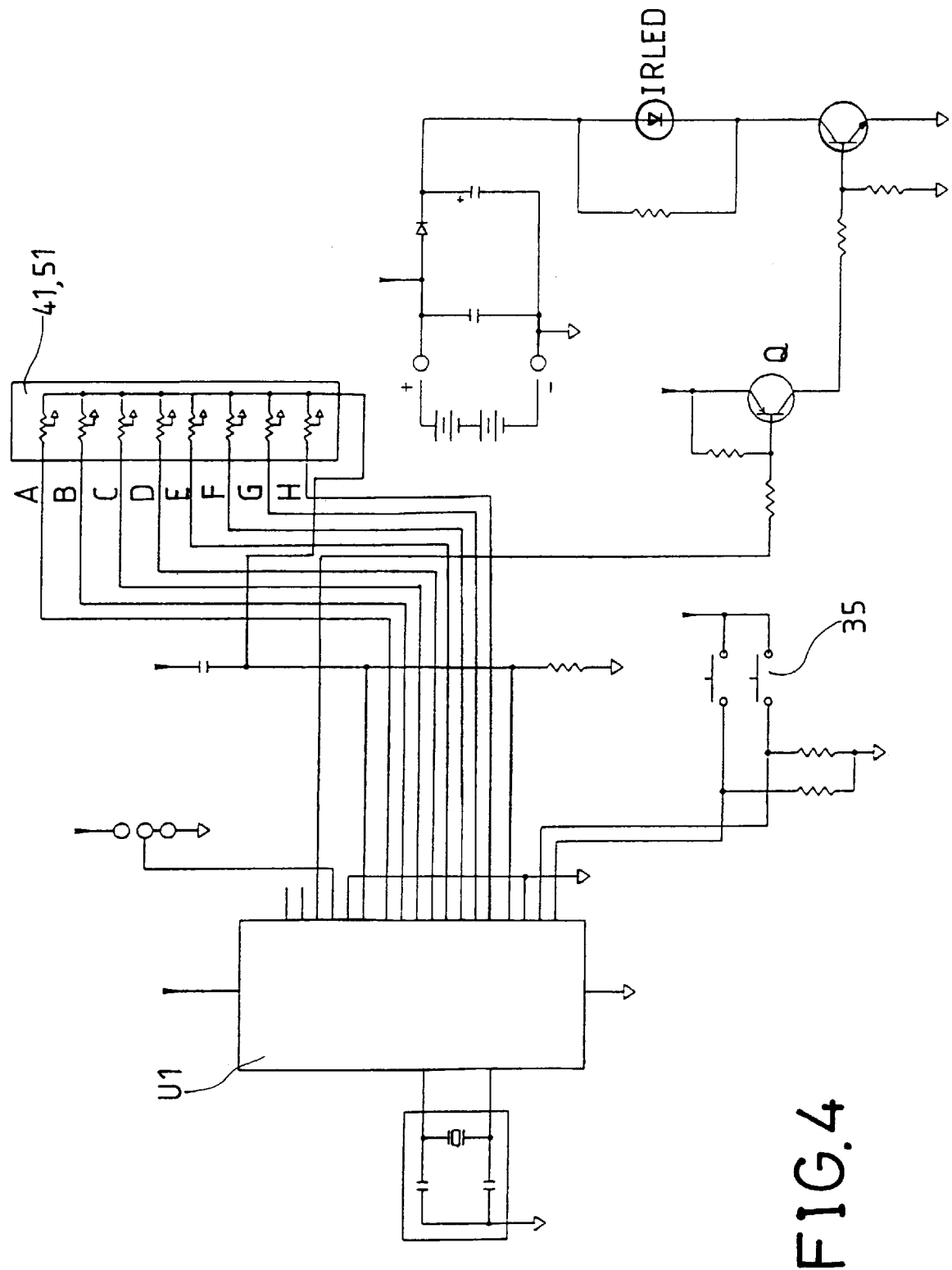
FIG. 4 is a circuit diagram showing an example of circuit that may be adapted in the computer pointing device of the present invention.

An example of the circuit is shown in FIG. 4. The circuit comprises a micro-processor U1 which receives the electrical signal from the eight conductors associated with the eight pins A–H. The electrical signal is processed by the micro-processor U1 in accordance with software implemented therein to generate, based on which of the depression pins A–H is depressed to cause a corresponding contact engagement between the associated conductor 42 and the conductive rib(s) 51 and the number of the ribs 51 that are contacted by the depressed conductor 42, a signal representing the moving direction and speed of the cursor. Such a signal is amplified by a transistor Q1 and transmitted to the computer by suitable means, such as cable connected between the pointing device 10 and the computer or, preferably and as shown in FIG. 4, by means of an infrared light emitting diode IRLED which emits a corresponding infrared signal to the computer. The computer, once receives the signal, moves the cursor on the monitor screen in accordance with such a signal.

The circuit may be designed in such a way that a depression occurring between any two successive depression pins 21 causes the micro-processor U1 to generate a signal indicating a direction between the two directions represented by the two depressed pins 21. Thus, a higher resolution in direction of movement of the cursor may be obtained. Of course, if desired, there may be more than eight depression pins 21 and the corresponding conductors 42 inside the collapsible projections 41 and this provides an even higher resolution in direction control.

Similarly, increasing the number of the concentric conductive ribs 51 on the circuit board 50 increases the resolution in speed control of the cursor. This may be done by for example having the micro-processor U1 to generate a speed signal based on the number of the conductive ribs 51 in contact engagement with a depressed conductor 42.

Although in the above description, the pointing device 10 is designed to generate a signal representing the moving direction and/or speed of the cursor based on the engagement of the conductors 42 with the conductive rib(s) 51, yet it is apparent that a pointing device that generates a cursor direction/speed signal based on the disengagement of the conductors 42 from the conductive rib(s) 51 may also be readily achieved by those skilled in the art.

As shown in FIG. 1, the computer pointing device 10 of the present invention is also provided with two click buttons 35 (also see FIG. 4) which act like the counterpart in the conventional mouse. Thus no detail of the click buttons 35 is needed herein.

Although the invention has been described by means of the preferred embodiment thereof, it is apparent to those skilled in the art that many changes, variation and modifications are possible without departing from the scope of the invention as defined in the appended claims.

What is claimed is:

1. A computer pointing device adapted to control movement of a cursor on a monitor screen, comprising:

a casing having a top side and defining therein an interior space, the top side having a plurality of openings formed thereon and spaced along a predetermined trace to surround a post extending from the top side of the casing and defining a ball-shaped top end;

a button having formed on an underside thereof a plurality of pins corresponding to the openings and a ball socket to rotatably fit over the ball-shaped top end of the post in such a way to allow the pins to be movable toward/away from the openings;

a circuit board disposed and fixed in the interior space of the casing, having at least one conductive rib provided thereon to extend on the circuit board to be corresponding to the trace of the openings;

a pad made of a resilient insulation material interposed between the circuit board and the top side of the casing, comprising a plurality of raised projections, each corresponding to one of the openings and defining therein a hollow space for receiving and retaining a conductor, the resiliency of the pad material allowing each of the hollow projections to be collapsible to make the conductor thereof contact and establish electrical connection with the rib for generating an electrical signal corresponding to the particular one of the projections; and circuit means provided on the circuit board which receives the electrical signal from the electrical connection of the conductor of the particular one of the projections and the rib and processes and converts the electrical signal into a signal representing a moving direction of the cursor on the monitor screen associated with and determined by the particular one of the projections, the circuit means further comprising transmitter means to transmit the signal representing the direction of the cursor to the computer; and wherein rotating the button about the ball socket brings at least one of the pins into contact engagement with the corresponding at least one of the projections via the respective openings so as to collapse the projections and thus establish the electrical connection between the conductors of the projections and the rib to generate said electrical signal.

2. The computer pointing device as claimed in claim 1, wherein the trace along which the openings are formed comprises a circle having a center at which the post is located.

3. The computer pointing device as claimed in claim 2, wherein the casing has eight openings disposed in an equally spaced manner to each representing a different direction.

4. The computer pointing device as claimed in claim 1, wherein the circuit board comprises at least a second conductive rib formed thereon and spaced from each other to be electrically engageable by the conductors inside of the at least one of the projections to provide an electrical signal to be converted into a signal representing a moving speed of the cursor in the direction associated with and determined by the collapsed projections.

5. The computer pointing device as claimed in claim 1, wherein the upper member of the casing further comprises two click buttons provided thereon and connected to the circuit means.

6. The computer pointing device as claimed in claim 1, wherein the transmitter means comprises an infrared light emitting diode.

7. The computer pointing device as claimed in claim 1, wherein the circuit means comprises a micro-processor for receiving the electrical signal from the electrical connection of the conductors of the at least one projection and the rib to provide the signal representing the moving direction of the cursor.

8. The computer pointing device as claimed in claim 4, wherein the circuit means comprises a micro-processor for receiving the electrical signal from the electrical engagement of the conductors of the at least one projection and at least one of the ribs to provide the signal representing the moving direction of the cursor and the signal representing the moving speed of the cursor.

9. The computer pointing device as claimed in claim 1, wherein the resilient insulation material comprises rubber.

10. The computer pointing device as claimed in claim 1, wherein the casing comprises a plurality of positioning pins fixed therein to be received within positioning holes formed on the circuit board and the resilient insulation pad to secure the circuit board and the pad in position inside the casing.

* * * * *